(12) United States Patent
Sachweh et al.

(10) Patent No.: US 6,284,022 B1
(45) Date of Patent: Sep. 4, 2001

(54) METHOD FOR REMOVING CONTAMINANTS FROM A GAS STREAM

(75) Inventors: Bernd Sachweh, Dannstadt-Schauernheim; Michael-Dieter Ulbrich, Freinsheim; Wolf-Steffen Weissker, Otterstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/290,884

(22) Filed: Apr. 14, 1999

(30) Foreign Application Priority Data

Apr. 20, 1998 (DE) .............................................. 198 17 468

(51) Int. Cl.⁷ ..................................................... B01D 47/00

(52) U.S. Cl. .................................. 95/149; 95/230; 95/237

(58) Field of Search ............................... 95/149, 230, 237

(56) References Cited

U.S. PATENT DOCUMENTS 2,303,318 * 12/1942 Baskervill .

OTHER PUBLICATIONS

Sachweh, *Messen, Konditionieren und Abscheiden feinster Aerosolpartikeln*, 1996 (entire book).

Heidenreich et al., *Abscheidung submikroner Partikel aus Gasstroemen in Fuellkoerperschuettungen*, Chemie Ingenieur Technik, 69, 1997, pp. 1113–1117.

17 BImsch V, 1990 (17th Ordnance relating to the Federal Immmission Control Act).

Schulte, *Abgasreinigung* (*Off–gas cleaning*), Springer–Verlag, Berlin, Heidelberg, New York, 1996 (entire book).

* cited by examiner

Primary Examiner—Chester T. Barry
(74) Attorney, Agent, or Firm—Keil & Weinkauf

(57) ABSTRACT

The invention relates to methods for removing gaseous contaminants and aerosols from a vapor-saturated gas stream, in which method a gas stream containing a) at least one gaseous contaminant which is soluble in a scrubbing liquid, with or without salt formation, and b) at least one aerosol with a particle size from 0.01 to 10 $\mu$m, is brought into contact, in a scrubber column, with a scrubbing liquid, the temperature of which is lower by at least 2° C. than the temperature of the gas stream, resulting in the formation of a vapor phase, the degree of saturation S of which is greater than 1, and in the removal of the gaseous and particulate contaminants from the gas stream.

14 Claims, 3 Drawing Sheets

METHOD FOR REMOVING CONTAMINANTS FROM A GAS STREAM

Figure 1:
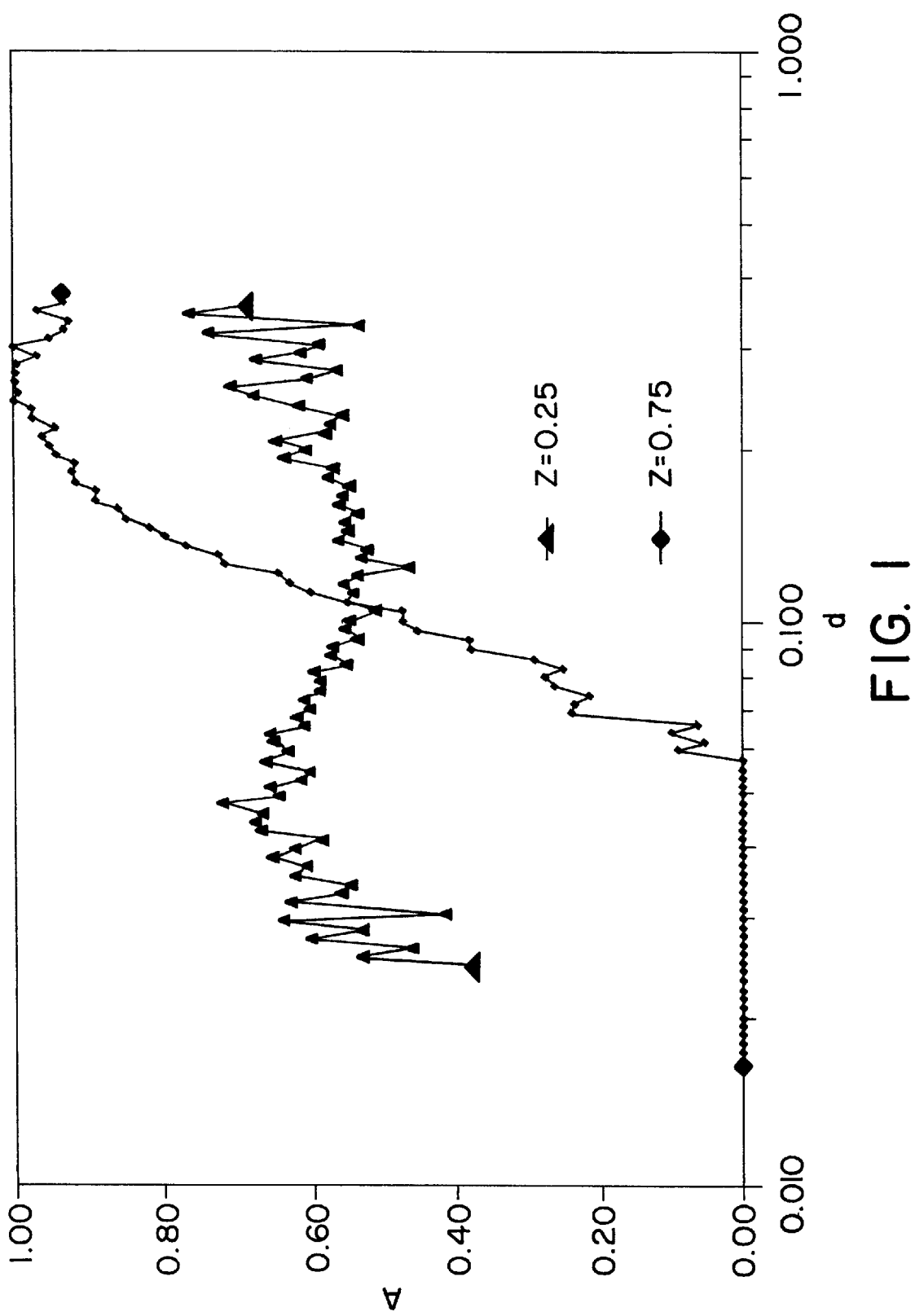

The present invention relates to a method for removing gaseous and particulate contaminants (aerosols) from a vapor-saturated gas stream, in which method a gas stream, containing at least one gaseous contaminant and at least one aerosol, is brought into contact with a scrubbing liquid in such a way as to form a vapor phase, the degree of saturation S of which is greater than 1.

In the past, progressive industrialization of the production of foodstuffs and consumer goods has often led to increased pollution of the air, particularly in industrial centers. In recent years, statutory measures have made it possible to reduce emissions from large-scale furnaces, for $SO_2$, $NO_x$ and dust, by approx. 80%.

With a few exceptions (e.g. in the case of fibrous dusts), pollutant limit values for emissions and immissions have often been fixed in the form of mass concentrations, so that in this analysis submicron particles are of minor importance. For example, in Germany, according to the 17th Ordnance relating to the Federal Immission Control Act (17. BImschV, 1990), up to 10 mg/m$^3$ (STP) of contaminants in dust form are permissible in the off-gas from an incinerator. This results, even for a particle size of 0.1 μm, in a particle surface area of 0.28 m$^2$/m$^3$ off-gas. From this, it is clear that even submicron particles provide an extremely large surface area on which substances can accumulate, representing a high health hazard potential. Such substances are, for example, heavy metals or numerous highly toxic gaseous and liquid components, including, for example, nuclear fission products.

Engineering processes, e.g. those which lie downstream of incinerators for production residues, often produce solid or liquid aerosols in addition to gaseous substances (e.g. HCl, HF, HBr or heavy metal vapors). The gaseous contaminants are usually scrubbed out in scrubber columns (absorption columns). However, the aerosols formed in the incineration process are generally very fine and often pass through the scrubber columns without any significant reduction in the level of such contaminants.

The combustion of production residues produces, for example, NaCl aerosols in concentrations of up to approximately 250 mg/m$^3$. The size distribution of such aerosols clearly lies in the submicron range. For this reason, deep-bed diffusion filters, wet scrubbers (e.g. Venturi scrubbers) or electrostatic filters have to be connected downstream. These standard processes generally entail high investment and/or operating costs.

The separation methods which are known from the prior art are generally unable to carry out all the cleaning functions required at the same time, i.e. they are either only able to ensure sufficient removal of particulate contaminants or are only able to remove gaseous pollutants from the gas stream. For example, the publication "Abscheidung submikroner Partikel aus Gasströmen in Füllkörperschüttungen" [Separation of submicron particles from gas streams in packed beds], by S. Heidenreich, H. Büttner and F. Ebert (Chemie Ingenieur Technik (69), 1997, pp.110 ff) describes a method for removing particulate contaminants from gas streams. In this method, a gas stream in a scrubber column which is filled with packing bodies is exposed to a countercurrent scrubbing liquid. The method described is carried out in two stages, a first stage using hot water for scrubbing and a second stage using cold water for scrubbing. However, the method described does not provide satisfactory simultaneous removal of particulate and gaseous contaminants.

A large number of methods for reducing the amount of gaseous contaminants in a gas stream are known from the prior art. An example which may be mentioned is the monograph "Abgasreinigung" [Off-gas cleaning] by M. Schulte (Springer-Verlag, Berlin, Heidelberg, N.Y., 1996). The monograph cites a considerable number of standard methods which are concerned with reducing the levels of sulfur, nitrogen, carbon and halogen compounds in off-gases and with reducing the hydrocarbon emissions.

However, a drawback of all the methods which are known from the prior art is that they only allow the removal of either gaseous contaminants or particulate aerosols. Therefore, to remove both types of contaminant from an off-gas stream, it is generally necessary to connect two method steps in series. However, in practice this entails high investment costs, since it is necessary to provide two, generally different, types of installation. Furthermore, this procedure increases the operating costs, since each stage generally has a high power and water consumption.

Therefore, there was a need for a method for the simultaneous removal of gaseous and particulate contaminants from gas streams which allows both types of contaminants to be removed from the gas stream in a single method stage.

It is an object of the present invention to provide such a method.

We have found that it is possible to remove both types of contaminants from gas streams if a vapor-saturated gas stream which contains both types of contaminants is fed through a scrubber column which has an internal surface area, produced for example by packing bodies, of at least approximately 100 m$^2$/m$^3$, and a degree of saturation S which is greater than 1 is used.

In the context of the present text, an "internal surface area" is understood to mean the surface area inside the scrubber column which is available for contact between gas stream and scrubbing liquid. In the text which follows, the internal surface area will also be referred to as the "contact surface".

Therefore, the present invention relates to a method for removing gaseous contaminants and aerosols from a vapor-saturated gas stream, in which method a gas stream containing a) at least one gaseous contaminant which is soluble in a scrubbing liquid, with or without salt formation, and b) at least one aerosol with a particle size from 0.01 to 10 μm, having a flow rate of at least 0.5 m/s and a temperature from 30° C. to 100° C. in a scrubber column which has an internal surface area of from 50 to 1000 m$^2$/m$^3$, is brought into contact, if appropriate following prior saturation with vapor, with a scrubbing liquid which has a feed rate Z to the scrubber column and the temperature of which is lower by at least 2° C. than the temperature of the gas stream, resulting in the formation of a vapor phase, the degree of saturation S of which is greater than 1, and in the removal of the gaseous and particulate contaminants from the gas stream.

Gas streams which are suitable are in principle all gas streams which have a carrier gas which is to be cleaned at the process temperature and which contains both gaseous and particulate contaminants which are to be removed.

Generally, particularly suitable carrier gases are those gases which, under the conditions of the method, do not undergo a reaction with any of the components involved in the method, i.e. with either the scrubbing liquid or a material of the apparatus in which the method according to the invention is carried out. Therefore, in a preferred embodiment of the invention, the carrier gas to be cleaned is a gas or gas mixture which is substantially inert under the reaction conditions and which has a boiling point which lies below at least approximately −50° C. Examples of gases to be cleaned are nitrogen, hydrogen, oxygen, carbon dioxide, helium, neon, argon, krypton or mixtures of two or more of these gases.

In a preferred embodiment of the invention, the carrier gas to be cleaned is a gas mixture formed in the incineration of production residues, for example in refuse incineration.

The gas stream used in the implementation of the method according to the invention is to be vapor-saturated. Preferably, the vapor phase is to be completely saturated with the vapor of the liquid which in the subsequent method is used as the scrubbing liquid.

"Vapor-saturated" is understood to mean the state in which the vapor phase contains its maximum level, as a function of pressure and temperature, of molecules of the compound in question. In this case, the degree of saturation S is said to be 1. If the vapor phase contains fewer molecules of the compound in question, the degree of saturation S is less than 1, while if it contains more molecules the degree of saturation S is greater than 1. The latter state is also referred to as "supersaturated".

As has already been mentioned, the vapor phase is preferably to be saturated with molecules of that compound which is used as the scrubbing liquid during the further method.

The "scrubbing liquid" refers to that liquid which is used in the context of the method according to the invention to remove the gaseous and particulate contaminants from the gas stream.

In principle, the method according to the invention is suitable for removing any gaseous and particulate contaminants from any gas streams, provided that the following conditions are satisfied:

The carrier gas must not be absorbed, or must only be slightly absorbed, by the scrubbing liquid or must not be soluble, or must be only slightly soluble, in the scrubbing liquid, with or without chemical change.

The gaseous contaminants must be absorbed by the scrubbing liquid to a very considerable extent, and preferably as completely as possible, or must be soluble in the scrubbing liquid, with or without chemical modification.

The particulate contaminants are to be soluble or at least suspensible in the scrubbing liquid, with or without chemical modification.

Therefore, in the context of the method according to the invention, it is possible to use both polar and nonpolar scrubbing liquids, depending on which gaseous and particulate contaminants are contained in the gas stream. However, in a preferred embodiment of the present invention, the scrubbing liquid used contains at least predominantly water. Suitable scrubbing liquids are, for example, distilled water, demineralized water, tap water, process water, aqueous solutions of acids or bases, or organic solvents such as toluol, butanol, ethanol or acetone.

The method according to the invention can also be used to treat gas streams which initially do not contain the requisite vapor saturation. In this case, the gas stream is laden with vapor until it is completely saturated in a saturation stage which is upstream of the actual method according to the invention.

The gaseous contaminants which can be removed using the method according to the invention include, for example, water-soluble gaseous contaminants. This is understood to mean contaminants which are so readily soluble in the scrubbing liquid that scrubbing the gas stream allows complete removal of the gaseous contaminant. For example, if water is used as the scrubbing liquid, it is then possible to remove, for example, the hydrohalic acids, HF, HCl or HBr, from the gas stream without problems. It is also possible to remove sulfur-containing gaseous contaminants, for example sulfur dioxide, hydrogen sulfide, carbon disulfide, carbonyl sulfides, sulfur halides or sulfur trioxide. Furthermore, when water is used as the scrubbing liquid, it is also possible to remove nitrogen oxides, ammonia, hydrogen cyanide, cyanogen chloride, phosgene and the like.

The particulate contaminants (aerosols) which can be removed in the context of the method according to the invention include both solid and liquid aerosols. These may, for example, be aerosols which are found in gas streams from combustion of residues or from flue-gas cleaning. In particular, they are the alkali-metal halides, such as NaCl, NaBr, NaF, KF, KBr or KCl, and ammonium salts, for example ammonium nitrate, the alkali-metal nitrates, the alkali-metal sulfates and further water-soluble salts, for example heavy metal salts of Hg, Pb or Cd, as well as solids which are not completely wetting but are water-dispersible, for example soot.

Furthermore, liquid particulate contaminants are suitable. Examples of these include acids, in particular sulfuric acid droplets or nitric acid droplets or a mixture of these.

The method according to the invention can be carried out with gas streams which contain a particle load in the order of magnitude of up to approximately 500 mg/m$^3$, preferably up to approximately 250 mg/m$^3$. The particle sizes of the aerosols may vary within a range of from approximately 0.01 to approximately 100 μm, the lower limit lying at approximately 10 to approximately 20 nm, and particularly advantageous effects are achieved with a particle size of from approximately 0.05 to 1 μm, for example approximately 0.1, 0.2, 0.4, 0.8 or 0.9 μm.

The method according to the invention is advantageously carried out in one or more scrubber columns which are connected in parallel or in series. The diameter of the scrubber column may in this case be approximately 0.1 to approximately 4 m, and the length of the scrubber column may be approximately 0.5 to approximately 10 m.

In principle, all scrubber columns in which the necessary contact surface is available are suitable. Examples of such columns are packed columns, plate columns or spray scrubbers. However, in a preferred embodiment of the present invention scrubber columns which have a packed bed are used. Suitable packing bodies have a diameter of from approximately 3 to approximately 50 mm. It is preferable to use packing bodies which provide a scrubber-column contact surface of from approximately 300 to 600 m$^2$/m$^3$.

Suitable packing bodies are, for example, packing bodies produced by Rauschert, for example High Flow 25, and also Raschig Pall-Ringe with a diameter of approximately 25 mm, Sulzer Packings, Raschig Ralu-Pack or packings made from monofilament fabric.

The temperature of the gas stream when it enters the column may be up to approximately 100° C. In a preferred embodiment of the invention, the temperature of the gas stream is approximately 40 to approximately 90° C., in particular approximately 50 to approximately 80° C., for example 60 or 70° C.

The temperature of the scrubbing liquid should be lower than the temperature of the gas stream. In a preferred embodiment of the present invention, the temperature of the scrubbing liquid lies at least approximately 10 to approximately 15° C. below the temperature of the gas stream, but in particular even further below this temperature. Examples of temperature differences which are particularly preferred are approximately 30 to approximately 60° C., in particularly approximately 40 to approximately 50° C.

In a preferred embodiment, the scrubbing liquid is at a temperature of from approximately 2 to approximately 50° C.

If the method according to the invention is to be used for cleaning particularly hot gas streams, such as those which are produced, for example, in incineration plants, the gas stream generally has to be cooled to the temperature indicated above before it is introduced into the scrubber column. This is advantageously carried out by means of quenching methods in which a cooling liquid, preferably the liquid which is later also used as the scrubbing liquid, is sprayed into the hot gas stream. This may, for example, take place in a spray scrubber or quench. Generally, in the course of such a cooling method, the gas stream becomes saturated with vapor. Such a preliminary treatment may have an advantageous effect on the further removal of the particulate contaminants, particularly in the case of soluble contaminants in salt form, in the following scrubbing stage according to the invention.

Therefore, in a preferred embodiment of the invention, gas streams which are at a temperature of greater than approximately 100° C. are cooled to a temperature of below 100° C., which corresponds to the required entry temperature to the scrubber column, by spraying in liquid, in particular scrubbing liquid, preferably in a spray scrubber or quench, before they are fed into the scrubber column.

The basis for the success of the method according to the invention is assumed to be that when the hot, vapor-saturated gas stream enters the scrubber column through which the colder scrubbing liquid is flowing, the vapor space in the gas stream becomes supersaturated with vapor at the cold surfaces in the scrubber column.

The degree of saturation in the vapor space is expressed as the degree of saturation S, which has the value 1 for complete saturation.

The supersaturation is produced by contact between the hot, vapor-saturated gas stream and cold surfaces. For this purpose, the hot, vapor-saturated off-gas is fed into a scrubber column through which cold water is being sprayed in cocurrent or countercurrent. Depending on the operating parameters selected, different levels of supersaturation in the gas stream can be achieved by means of the surface-limited heat and mass transfer. Preferably, the level of supersaturation is set in such a way that the bottom part of the packed bed is used essentially to form drops on the particulate contaminants, as a result of condensation from the supersaturated vapor space on the particles, and the top part of the scrubber column is used to separate out the drops.

In order to set the operating parameters of the scrubber column as optimally as possible, it is advantageous if, for a specific scrubber column with a specific surface area which is preferably brought about by packing bodies, the degree of saturation S is known in each area of the column. It is thus possible to optimize parameters such as the temperature of the gas stream, the temperature of the scrubbing liquid, the length of the scrubber column or the internal surface area of the scrubber column.

By calculating the linked mass/heat transfer on a segmental basis, it is possible to calculate a temperature and concentration profile for a scrubber column in cocurrent and countercurrent. For a column operated in countercurrent, it is possible to use, for example, the commercially available "ASPEN RATEFRAC"® heat/mass transfer simulator (manufacturer: ASPEN Technology, Cambridge, Mass., USA). For this purpose, the scrubber column is theoretically divided into individual segments, and in each segment i the partial pressures $p_i$ of the gaseous components are calculated.

However, the gas phase and the liquid phase are not in equilibrium in the individual segments. Therefore, the results are the partial pressures of the condensable components for the gas phase which is not in equilibrium $\Sigma p_j^\infty$, where j represents a variable for the number of different components in vapor form.

An isothermal equilibrium stage is then calculated for this gas phase in the course of the method according to the invention.

This calculation provides the partial pressures for the condensable components in the isothermal equilibrium $\Sigma p_{j,Glw}^\infty$.

From the results for the adiabatic gas phase and the isothermal gas phase, it is possible to calculate the degree of saturation $S_i$ for each individual scrubber column segment using equation 1 (Eq-1)

$$S_i = \frac{\sum P_j^\infty}{\sum p_i^\infty Glw} \quad \text{Eq-1}$$

The degrees of saturation $S_i$ which have been calculated in this way can now be used to estimate whether a level of supersaturation which is necessary to activate small nuclei or nuclei which are difficult to wet has been reached.

For such an estimation, the critical nuclei diameters are calculated for various degrees of saturation $S_i$ (Köhler curves). The shape of such Köhler curves is dependent on the wettability of the particulate contaminants. To calculate Köhler curves for differently wettable or soluble particulate contaminants, reference is made to the postdoctoral thesis "Messen, Konditionieren und Abscheiden feinster Aerosolpartikel" [Measuring, conditioning and separating out extremely fine aerosol particles] by Dr. Ing. Bernd A. Sachweh, Mechanical and Process Engineering Department of the University of Kaiserslautern, 1996. Relevant portions of the thesis follow.

1 Introduction

Industrial development and the increase in traffic have led in recent decades to considerable environmental problems in which air pollution occupies an important place. This requires political measures which led in 1974 to the passing of the German Federal Air Pollution Prevention Act, the first comprehensive act on combating air and noise pollution. In addition to provisions which are immediately applicable, it contains enabling measures for regulations and administrative provisions. The large-scale fired-plant regulation of 1983 and the technical instructions on air pollution control (TA-Luft) of 1986, after consideration of the proportionality and the assurance of reasonable transition periods, have created comprehensive remediation programs for all existing power stations or relevant industrial plants. Measures in this area have decreased emissions from industrial fired plants for $SO_2$, $NO_x$, and dust in the last 10 years by approximately 80%.

Pollutant limit values for emissions and air pollution are set, with few exceptions (for example fibrous dusts), according to the currently valid legal framework in the form of mass concentrations, which give submicron particles only low importance in this assessment. Thus, according to the 17th regulation of the German Federal Air Pollution Control Act (17. BImschV, 1990) up to 10 mg/M$^3$ (under normal conditions) are permitted for dust impurities in the exhaust gas of a waste incineration plant. Thus for a particle size of 0.1 μm this already gives a particle surface area of 0.28 m$^3$ in a cubic meter of exhaust gas at STP. This small theoretical example is intended to illustrate the extremely large surface area of submicron particles, on which substances which are potentially very hazardous to health can he accumulated. These substances are, for example, heavy metals, many highly toxic gaseous and liquid components and nuclear fission products.

It would therefore be advisable to evaluate submicron particles according to their numerical concentration and particle size distribution in the exhaust gas. This application requires provision of the relevant measuring technique; this is the synthesis of representative sampling, measuring and data processing. For the currently used aerosol measuring systems there is a measuring range limit determined by the measuring principle in the size range between 0.5 and 1.0 μm. Although sampling of submicron particles is simplified by the low inertia, since the isokinetics which are frequently complex to establish can be avoided, frequently conditions are present at the particle formation site which make it difficult to use commercially available measurement systems. This follows from the fact that the developed submicron measurement methods are generally configured for low volumetric flow rates at generally ambient conditions or even clean room conditions, which makes it difficult to use them for industrial problems. Additional difficulties occur owing to the high interaction of aerosol particles with the surrounding carrier gas (condensation, evaporation), or if chemically aggressive substances are present in the exhaust gas which would lead under some circumstances to destruction of the sensitive measuring instruments. The applicability of the measuring method selected must be tested in detail for such applications. It is frequently possible to condition the aerosol to the instrument conditions, which in the simplest case can be performed by adding particle-free diluent air to the sample air stream. The purpose of conditioning in this case is temperature reduction, dew-point reduction or lowering of the concentration of the particle phase to be measured. At the same time any substances which may be present which are problematic from the analytical viewpoint can under some circumstances be diluted to the point that the use of sensitive instruments becomes possible, at least for a limited time. Without wishing to discuss the advantages and disadvantages of individual measurement systems at this point, some examples of measurement systems are mentioned below which can be used in the submicron range in order to determine numerical concentration and particle size distribution:

Low-pressure impactors (50 nm–4 μm)
Laser light optical particle counter (50 μm–1 μm)
Condensation particle counter (>2 nm)[1]

[1] Size sensitive in the range >10 nm combined with a differential electric mobility analyzer (DMA, see section 4.1)

In the context of this work, the measurement methodology for submicron particles is shown for water-vapor-saturated exhaust gas streams of temperature up to 70° C. A commercial measurement system (scanning mobility particle sizer, TSI model 3934) is used here, which combines a condensation particle counter with a differential electric mobility analyzer. This measurement system enables particles to be measured with high resolution in the size range of 16–1000 nm. The sample volumetric flow rate is 0.1–0.6 l/min at a maximum permissible gas temperature of 35° C., so that in most applications mixing with particle-free cold air is necessary in order to cool the intake gas stream and simultaneously lower the dew point. This measuring system has been used both in the laboratory on a pilot plant and in industrial measurements, for example in the flue gas downstream of fluidized-bed combustion.

In order also to be able to measure broad size distributions above the above-specified range, in addition a modified optical particle counter (OPZ, type Umhauer /56/) in the size range 0.5–10 μm was used. By optimization using a digital data analysis technique /55/ specially developed for this measurement system, the measurement accuracy was increased, inter alia, at the lower limit of detection, which facilitates the combination of the size distributions determined by the two measurement systems, and, owing to knowledge of the counting efficiency, makes it possible at all. An expedient procedure for linking the number density distributions of the two systems is described in this work.

A further problem with respect to submicron impurities in exhaust gas is to be demonstrated with reference to the example of the large Mannheim power plant /1/, where after startup of the flue gas desulfurization system a flue gas plume developed which was formed during cooling owing to formation of salts in gas-phase reaction (for example gaseous ammonia with hydrogen chloride or hydrogen fluoride). When salt-containing, generally submicron, aerosols are present in the exhaust air of, for example, waste, special waste and wastewater incineration plants, even modern high-efficiency separators, for example electrostatic precipitators, are not able to retain these aggressive substances. An elegant possibility for separating submicron particles is given in principle by the heterogeneous condensation of water vapor on the particle surface, if this can be increased by conditioning such that simple inertial separators are sufficient to remove them from the exhaust gas stream. Heterogeneous water vapor condensation has already been studied for some time theoretically and experimentally with occasionally highly contradictory results. The reason for this is the complexity of the individual processes involved. A penetrating theoretical consideration is given, inter alia, by Barret&Clement /2/. Experimental studies exist by Yoshida et al. /3/, /4/, Semrau /5/, Lehmann /6/, Lancaster&Strauβ /7/ and Büttner /8/. Fattinger&Jäger /9/-/11/ describe, in a series of publications, improved separation of fine dusts by aerosol conditioning.

The purpose of the investigations was to develop fundamental design data for aerosol conditioning by heterogeneous water vapor condensation on an experimental pilot-scale plant. To produce the supersaturation, two water-vapor-saturated air streams of different temperature were mixed coaxially. A central point of these studies was to determine the thermodynamic boundary parameters to achieve an efficient droplet growth. If droplet sizes above 3 μm can be established, simple aerocyclones are sufficient in order to separate the drops from the gas stream. Another aspect in this connection is the width of the resulting droplet size distribution which, when an inertial separator is used, codetermines the total separation efficiency. In principle, conditioning by water vapor condensation offers the advantage that narrow droplet size distributions are formed which can then be separated in a cyclone with virtually equal probability, and thus an equally good separation of all nucleus sizes is achieved. In addition, the mixing kinetics of the two air streams is discussed, which substantially influences nucleus activation, that is to say the conversion of nuclei into droplets and thus is a critical parameter for the total degree of separation achievable.

A high performance cyclone was used to remove droplets from the gas stream. Ay measuring the nucleus phase downstream of the cyclone, from a measurement with and without condensation, the degree of separation for this effect can be determined. The droplet phase was measured in-situ using the optical particle counter. The measurements were carried out in two different concentration ranges. Firstly, high numerical concentrations ($>10^5$ #/cm$^3$) were achieved, in order to create industrially relevant basic conditions. Secondly, measurements were performed in the low-concentration range ($\approx 10^4$ #/cm$^3$) in order to create ideal preconditions for the condensation, in particular to exclude interactions of the particles with one another. By this means the limit values for real droplet growth and the scattering width of the droplet size distribution should be estimated experimentally and compared with a simple theoretical model.

2. Particle size-changed Processes
2.1 Condensation
2.1.1 Definitions and terms If a pure liquid is charged into a closed evacuated vessel, molecules escape into the space above the liquid surface. In the equilibrium or saturation state, the number of escaping liquid molecules is identical to the number of reentering vapor molecules, and above the flat liquid surface the saturation vapor pressure $p'_{vs}$ of the pure component is established, which is a function only of temperature. If, in addition, non-condensable gas is charged and the total pressure p is thus increased, then in the saturated gas-vapor mixture a vapor pressure $p_{vs}$ differing from $p'_{vs}$ is established which, in addition to temperature T is also a function of the total pressure p in the system. To estimate the pressure dependency it is assumed that in equilibrium the specific free energies of vapor $g_v$ and liquid $g_l$ are equal. For the pure vapor component the following applies:

$$g_v(T, p'_{vs}) = g_l(T, p'_{vs}). \tag{2-1}$$

If the total pressure is then increased by dp, the specific free energies of the two phases also change, each by the same amount, since equilibrium prevails. From the condition $dg_v = dg_l$ and taking into account T=const., the following applies:

$$v_v dp_v = v_l dp. \tag{2-2}$$

Since the specific liquid volume $v_l$ is always much smaller than the specific vapor volume $v_v$, it is possible to derive from equation (2-2) directly that in the case of an isothermal increase in total pressure p the saturation pressure $p_{vs}$ increases considerably more slowly. Assuming ideal gas conditions, it then follows that $$\frac{dp_v}{p_v} = \frac{v_l}{R_v T} dp. \tag{2-3}$$

If the left side of equation (2-3) is integrated within the ranges $p'_{vs}$ and $p_{vs}$ and the right side within the corresponding limits $p'_{vs}$ and p, the liquid volume being assumed to he incompressible, power series expansion for the saturation pressure results in $$p_{vs}(T, p) = p'_{vs}(T)\left\{1 + \frac{v_l(T)}{R_v T}[p - p'_{vs}(T)] + \ldots\right\}. \tag{2-4}$$

Analysis of equation (2-4) shows that for pressures p<10 bar, the difference from $p_{vs}$ and $p'_{vs}$ is less than 1%, and can thus generally be ignored. In the following, the considerations are to be restricted to the water vapor in air system as the non-condensing gas. To calculate the saturation vapor pressure, for example, the simplified equation of Clausius-Clapeyron, as reported in Amelin /12/

$$P_{vg}(T) = 10^{A - \frac{B}{T}} \tag{2-5}$$

can be used. For water in the temperature range between 20 and 100° C., using the constants A=8.8444 and B=2224.4 and the temperature T in Kelvin, this gives the vapor pressure in the unit torr, with the relative deviation in the specified temperature range from tabulated standard values (e.g. from the VDI heat atlas (Wärmeatlas)) always being less than 2%.

The previous considerations relate to the thermodynamic states in equilibrium between vapor phase and liquid phase. However, in the case of water-vapor condensation, the non-equilibrium states are in the foreground and must be characterized appropriately. An important variable in this context is the degree of saturation S which defines the deviation of the actual vapor pressure from the equilibrium or saturation state. This gives, following the definition of relative humidity $$S = \frac{p_v(T)}{p_{vs}(T)}, \tag{2-6}$$

where $p_v$ is the partial pressure of the water vapor in the system. In the event of supersaturation, S is greater than 1 and characterizes the driving gradient when water vapor condenses out. The water content x associated with the partial pressure $p_v$ is by definition the amount of water vapor based on the amount of dry air which, assuming ideal gas conditions can be calculated as $$x = \frac{M_W}{M_L}\frac{p_v}{p_g} = 0.622\frac{p_v}{p_g} = 0.622\frac{p_v}{p - p_v}, \tag{2-7}$$

where $p_g$ is the partial pressure of the air, $M_L$ is the molar mass of the air and $M_W$ is the molar mass of water. A further important parameter for describing the state of moist air is the specific enthalpy which, assuming that no water is present in liquid form, can be calculated summarily from the contents of dry air and water vapor as $$h_{1+x} = c_{pL}1 + x(c_{pW}1 + r_0), \tag{2-8}$$

where $c_{pL}$ and $c_{pW}$ are the specific heat capacity of air and of water vapor, $r_0$ is the vaporization enthalpy at 0° C. and t is the temperature in °C.

2.1.2 Kelvin effect

Considering now the water droplets/air aerosol system, the important difference from the previous considerations is the now curved phase boundary between liquid and vapor. This changes the forces of attraction between the liquid molecules at the surface, so that in the case of a convex curve the particles leave the molecular association more readily. In order to compensate for this vaporization process, a correspondingly higher vapor pressure must counterreact than in planar phase boundaries. This effect, which becomes the more apparent the smaller the particle radius is, was published by Kelvin /13/ as early as 1870.

In order to derive the saturation vapor pressure over curved surfaces, the change in Gibbs free energy on the vapor to liquid phase transition is considered for the case of condensation on the pure component which is termed homogeneous condensation. From a defined number of vapor molecules $N_{v,0}$ liquid nuclei are produced in a closed system consisting of $N_l$ liquid molecules. Thus the number of vapor molecules changes to $N_{v,1}=N_{v,0}-N_l$ and as a result the Gibbs free energy.

$$\Delta G = N_l g'_l + 4\pi R_p^2 \sigma_{gl} + N_{v,1} g'_v - N_{v,0} g'_v$$

or $$\Delta G = N_l (g'_l - g'_v) + 4\pi R_p^2 \sigma_{gl} \tag{2-9}$$

Taking into account the fact that under isothermal changes in state the work required for volume change is equal to the change in specific free energy (dg'=v'dp) and the molecular volume of the vapor $v'_v$ is considerably greater than the molecular volume of the liquid $v'_l$, for the difference between the specific free energies per liquid molecule or vapor molecule the following applies $$g'_l - g'_v = -kT \ln \frac{p_{vs}}{p_{vs,\infty}}, \tag{2-10}$$

where $p_{vs}$ is now the vapor pressure over the curved surface and $P_{vs,\infty}$ describes the vapor pressure over the planar surface. Substituted into equation (2-9) this gives $$\Delta G = \frac{4}{3}\pi R_p^3 \frac{kT}{v'_l} \ln S + 4\pi R_p^2 \sigma_{gl}. \tag{2-11}$$

The degree of saturation S occurring in equation (2-11) characterizes the minimum supersaturation which must be exceeded in the aerosol system in order to be able to condense water vapor on a curved nucleus surface. If equation (2-11) is applied over the nucleus radius $R_p$, a maximum is given at the point $R_p = R_p^*$. At this point phase equilibrium exists between vapor and liquid. The Kelvin (Thomson-Gibbs) equation, which is known to describe the relationship between supersaturation and particle radius in equilibrium for defined systems of substances and thermodynamic parameters, from the condition $(\partial \Delta G / \partial R_p)_{T,P}=0$ at the position $R_p=R_p^*$ gives $$\ln S = \frac{2\sigma_{gl} v'_l}{kTR_p^*} = \frac{2\sigma_{gl} M_W}{\rho_l RTR_p^*}, \tag{2-12}$$

where the molecular volume $v'_l$ can be determined by the Boltzmann constant k, the liquid density $\rho_l$, the molar mass of water $M_W$ and the ideal gas constant $\Re$ as $v'_l=M_W k/(\rho_l \Re)$. The critical free energy for formation of a nucleus having the equilibrium radius $R_p^*$ is then $$\Delta G^*(R_p^*) = \frac{16\pi \sigma_{gl}^3 v'^2_l}{3k^2 T^2 \ln^2 S}. \tag{2-13}$$

Since the Gibbs free energy has a maximum at the point $R_p=R_p^*$ this is only a metastable equilibrium state. A change in the boundary conditions, for example supersaturation, leads to immediate change in particle size by condensation or evaporation. If no nuclei are present in the system ($R_p^* \to 0$), according to equation (2-12) theoretically infinitely high degrees of saturation are necessary for condensation. However, in fact, above degrees of saturation of 2–3, increased clustering of vapor molecules occurs, and the clusters formed then act as condensation nuclei.

The vapor pressure over a droplet which contains soluble substances can also be determined using equation (2-12), but in this case the vapor pressure above the planar surface (characterized by the index "vsl,∞") of pure water must be replaced by that of the solution. This can be determined using the Raoults law, $p_{vsl,\infty}=x_W \gamma_W p_s,\infty$ where $x_W$ is the mole fraction of water and $\gamma_W$ is the activity coefficient of the solution. Ignoring the volume of the dissolved substance compared with the droplet volume, this gives the expanded Kelvin equation, taking into account the solution effect, as $$\ln S = \frac{2\sigma_{gl} M_W}{\rho_l RTR_p^*} + \ln(\gamma_W) - \ln\left(l + \frac{3im_S M_W}{M_S \rho_l 4\pi R_p^{*3}}\right). \tag{2-14a}$$

An approximation used in the literature for equation (2-14a) is obtained in the case of ideal dilute solutions by using the approximation $\gamma_W=1$ and a series expansion of the ln term on the right side of the equation (2-14a) as $$\ln S = \frac{2\sigma_{gl} M_W}{\rho_l RTR_p^*} - \frac{3im_S M_W}{M_S \rho_l 4\pi R_p^{*3}}. \tag{2-14b}$$

Equilibrium curves (Köhler curves) for water and an aqueous sodium chloride solution at a temperature of 50° C., which were calculated using equations (2-12) and (2-14a) can be shown. At a given constant supersaturation, pure water droplets whose radius is greater than the critical radius begin to grow due to condensation. Correspondingly, droplets having a radius smaller than the critical radius evaporate. Slightly different conditions are found for droplets of the salt solution. Many salt aerosols which are formed in industrial processes by gas-phase reactions, for example downstream of absorption towers or flue gas scrubbers, have mean crystal diameters of approximately 0.1 $\mu$m. For this reason, an NaCl nucleus of this size was used as the basis to calculate the Köhler curve in FIG. 2-1. In contrast to the processes in pure water, salt nuclei grow with dimensions below the critical diameter even in a subsaturated atmosphere (S<1) to form droplets whose diameter is given by the equilibrium radius. For sodium chloride, under the given conditions, the transition from solid crystal to a droplet consisting of saturated salt solution is already at S≈0.8. In order to initiate substantial further growth of the salt droplets to radii $R_p$>400 nm, a defined, but very low, minimum supersaturation must be exceeded. From the above diagram it can be summarized that the supersaturation required for activation of particles relevant to emissions ($R_p$>0.1 $\mu$m) is in the range of a few per cent, if water vapor condenses to droplets with or without dissolved components.

Figure 2:
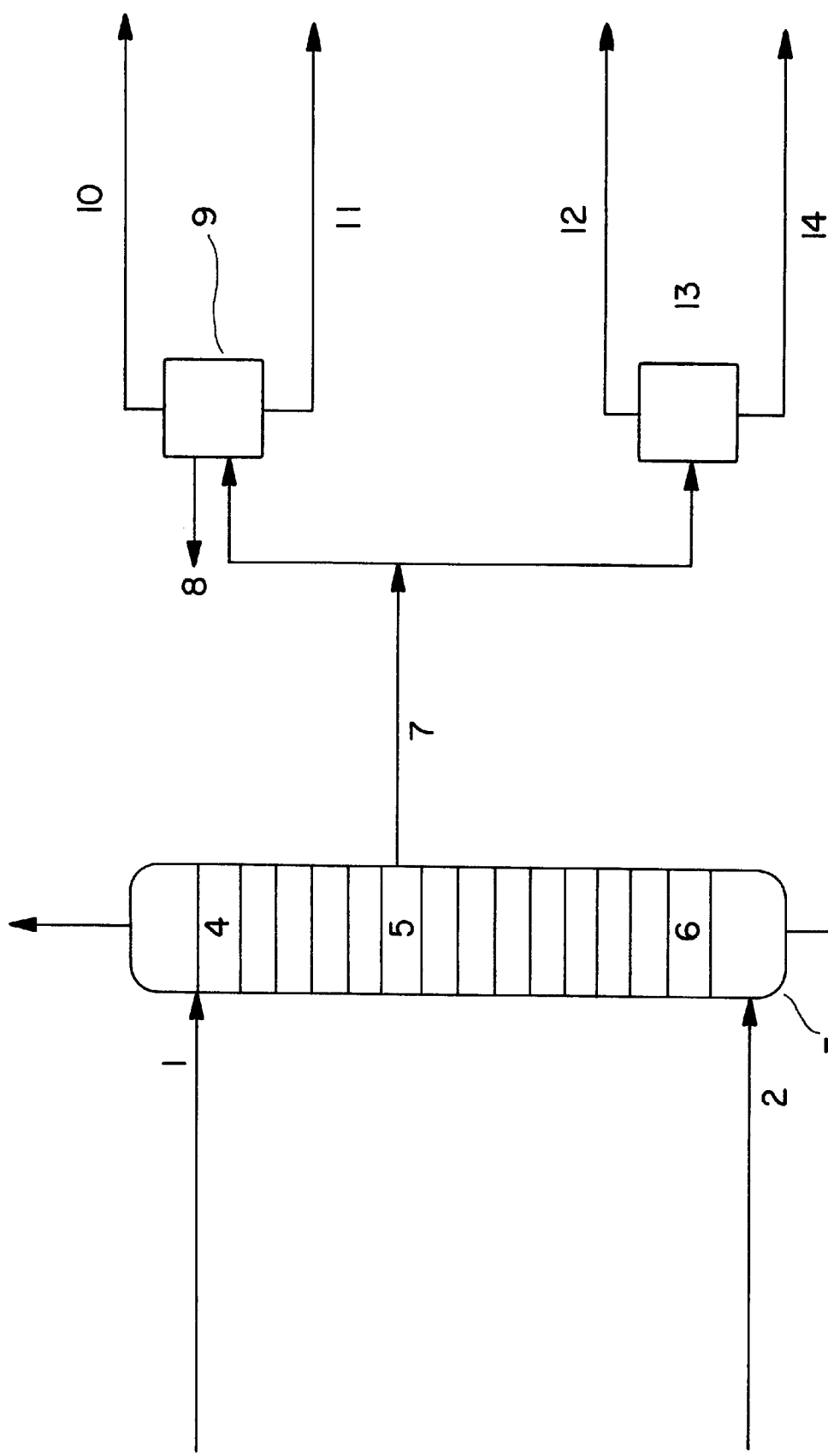

The case of more interest industrially, however, is heterogeneous condensation, that is to say water vapor condensation onto particles of different substances, which was first treated theoretically by Fletcher /14/ in 1958. In this treatment, in addition, the wettability of the particle surface was taken into account as a variable effecting condensation. The consideration starts from a three-phase system, as shown in FIG. 2-2. In this case the indices (1), (2) and (3) characterize the vapor phase, liquid phase (condensation droplets) and nucleus particle phase, with the latter being able to be solid or liquid.

The free energy of formation of a condensation droplet having the radius r on the nucleus particle having the radius $R_p$ is given by $$\Delta G = N_1 (g'_1 - g'_v) + S_{12} \sigma_{12} + S_{23} (\sigma_{23} - \sigma_{13}). \tag{2-15}$$

where $S_{12}$ and $S_{23}$ are the contact surfaces between phases 1 and 2, and between phases 2 and 3, respectively, and $\sigma_{12}$, $\sigma_{23}$ and $\sigma_{13}$ are the surface tensions or appropriate phase pairings. Solving the differential equation $\partial(\Delta G)/\partial r$ in a similar manner to the homogeneous condensation is difficult here, especially since the parameters $\sigma_{23}$ or $\sigma_{13}$ are frequently not accessible. Therefore, Fletcher proposes an alternative procedure, bypassing the differentiation. Independently of the shape, or even of the presence, of a nucleus, the Kelvin equation (2-12) for the critical condensation droplet radius r=r* must be fulfilled, since this is in metastable equilibrium with the vapor phase. Equation (2-15) gives the free energy of formation of a condensation droplet having the critical radius r=r* on a nucleus particle having $R_p=R_p^*$, when the relationships listed in appendix 10.1 for the volume $V_2$ of the condensation droplet, the surface area $S_{12}$ between phases 1 and 2, the surface area S23 between phases 2 and 3, the number of liquid molecules $N_l$, geometrical relationships for angles $\phi$ and $\psi$ and the length d and equation (2-12) are used, as $$\Delta G^* = \frac{8\pi\sigma_{12}^3 v_l'^2}{3k^2 T^2 \ln^2 S} f(m, x), \qquad (2\text{-}16)$$

where $$f(m, x) = 1 + \left(\frac{1-mx}{g}\right)^3 + x^3\left[2 - 3\left(\frac{x-m}{g}\right) + \left(\frac{x-m}{g}\right)^3\right] + 3mx^2\left(\frac{x-m}{g} - 1\right)$$

$m=\cos(\theta)=(\sigma_{13}-\sigma_{23})/\sigma_{12}$ (Young's equation) $x=R_p/r^* g(m,x)=(1+x^2-2mx)^{1/2}$.

For the case of homogeneous condensation, that is to say x=0, f(m,x)=2 and equation (2-16) is equivalent to equation (2-13). For x→∞, this is the planar surface case, f(m,x)→∞, and ln S thus approaches 0. Equation (2-16) therefore gives completely plausible results for this limit value consideration. Below, in addition, the kinetics of condensation droplet formation must be considered, since using equation (2-16), $\Delta G^*$ is known, but not the critical nucleus particle radius $R_p^*$, because the differential equation has not been solved. An additional piece of information is required which is given via the rate of formation of condensation droplets per particle $$J_{KN} = K 4\pi R_p^2 \exp\left(-\frac{\Delta G^*}{kT}\right) \qquad (2\text{-}17)$$

In order to achieve substantial droplet growth, this formation rate must be at least 1 per second and nucleus particle, with a change of some orders of magnitude having a negligible effect on the final result—the calculation of $R_p^*$, and thus there are no great demands of accuracy as to the numerical value of $J_{KN}$. If the upper limit value of $J_{KN}$ is used for droplet growth and equation (2-16) is substituted in (2-17) this gives $$\ln S = \left[-\frac{8\pi\sigma_{12}^3 f(m,x) v_l'^2}{3k^3 T^3 \ln[1/(4\pi R_p^3 K)]}\right]^{1/2}. \qquad (2\text{-}18)$$

The goal is now to determine the degree of saturation S associated with the equilibrium radius $R_p^*$ of the nucleus particles. The calculation procedure is described as follows: starting from a predefined numerical value for S and the additionally required boundary values for the underlying thermodynamic state, the critical radius r* of the condensation droplet can be calculated using equation (2-12). For a constant wetting angle $\theta$ then, in an iterative calculation method, $R_p$ can be varied until the degree of saturation according to equation (2-18) agrees with the predetermined value within a certain limit of accuracy which is established by a maximum relative deviation. In this case, the equilibrium state is reached and therefore the equilibrium radius $R_p^*$ of the nucleus particles is determined with the predefined accuracy.

The calculation method has been implemented in the programming language Borland Pascal 7.0 for IBM-compatible personal computers, in which case, beginning with a start interval, within which the sought-after nucleus particle radius must lie, the solution is determined by iteration via successive reduction of the interval width. To validate the program the critical radii for degrees of saturation between 1.5 and 1.0 and a wetting angle of $\theta=0°$ was calculated and compared with values of the Kelvin equation (2-12). The maximum relative deviations occurring in this case were always less than 1%. To estimate the supersaturations necessary for condensation on non-wettable particles, as examples, the wetting angles for $Al_2O_3$, $TiO_2$, $SiO_2$ and soot which were determined by Chen et al. /15/ were used. The authors used the measurement methods developed by Ayala et al. /16/, with only the results of the optical wetting angle measurements on sintered tablets of the respective powder being reproduced in table 2-1.

TABLE 2-1

Wetting angles for $Al_2O_3H_2O$, $TiO_2/H_2O$, $SiO_2H_2O$ and soot/$H_2O$/15/

| Material | Wetting angle (degrees) |
| --- | --- |
| $Al_2O_3/H_2O$ | 57 |
| $TiO_2/H_2O$ | 52 |
| $SiO_2/H_2O$ | 33 |
| soot/$H_2O$ | 40–90 |

The measurements were made at ambient conditions, in which case when the measured values are converted to condensation processes at higher temperatures, an appropriate increase in the wetting angle must be taken into account (Bergh /17/, Pashley&Kitchener /18/).

Figure 3:
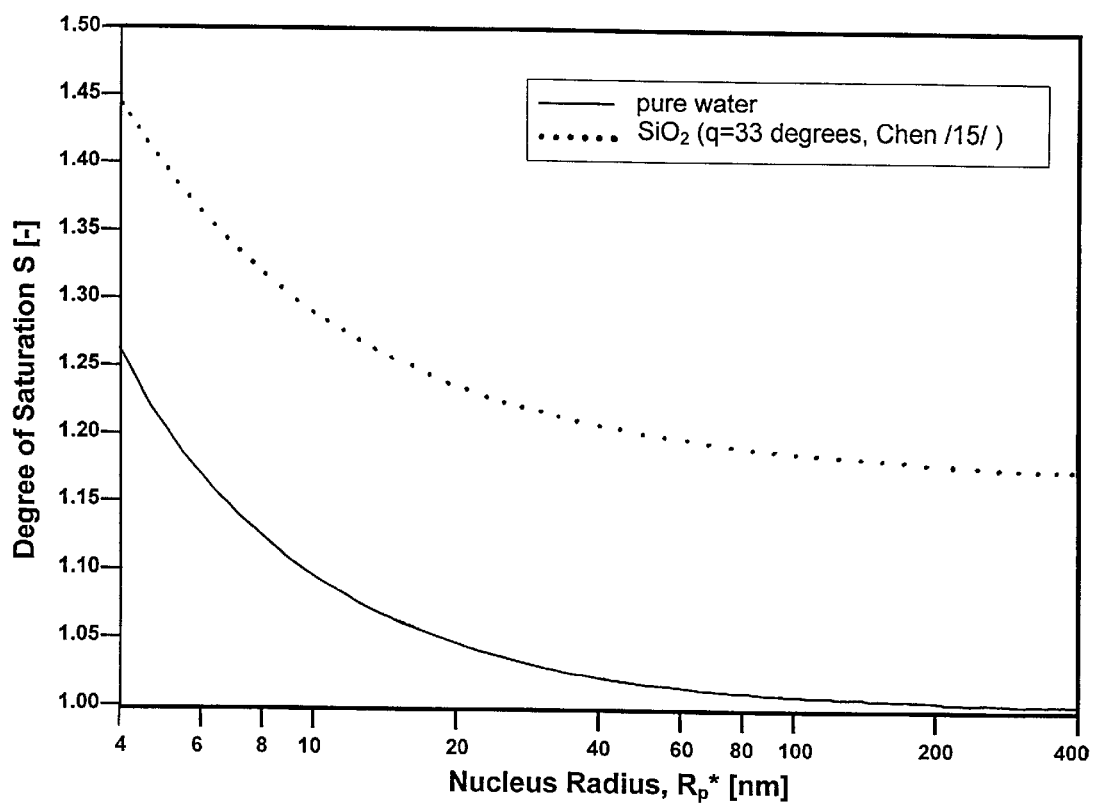

In FIG. 3 the equilibrium curve for $SiO_2$ particles is compared with that of pure water at a temperature of 50° C. Independently of the nucleus radius, a significant effect of wetting properties on the critical supersaturation can be observed. For particles having diameters in the micrometer range, the critical degrees of saturation are always still greater than 1.15, whereas the values for pure water are already close to 1.0. This result gives the first indications of the difficulties to be expected in industrial condensation on non-wettable particles. The experimental studies carried out by Chen et al, /15/ on the activation of incompletely wettable nuclei in a cloud chamber, however, show values approximately 30% lower for the critical supersaturation.

2.2 Dynamics of Droplet Growth

Section 2.1.2 showed what degrees of supersaturation are necessary in order, in the case of heterogeneous water-vapor condensation, to activate nuclei whose radius $R_p$ is greater that the critical radius $R_p^*$. However, no information is available to date on the time course of droplet size change. In this section it will be shown how the dynamics of a process of this type can be described, since this has a direct effect on the various potential methods of industrial implementation. In addition to the condensation effect, the growth by droplet coalescence will also be included in the considerations.

2.2.1 Growth by Condensation

The growth rate due to heterogeneous water-vapor condensation on small nucleus particles will be estimated below. It is assumed that the nuclei are rapidly covered with a thin liquid layer before a macroscopically perceptible droplet growth occurs and thus have the surface properties of small water droplets. Other important assumptions are as follows:

- Nuclei are substantially larger than the mean free path length of the vapor/air molecules (continuum region)
- Concentration profile and temperature profile in the region of the particle surface are in equilibrium before substantial particle growth occurs
- External heat flow dominates Initially, the classical derivation of growth equation by Maxwell /19/ will be shown, which is given by the simplified kinetic gas theory. In this case mass flows are only caused by concentration gradients (Fick's law), heat flows correspondingly due to temperature gradients (Fourier's law), In addition to the above-defined assumptions, the rate of droplet growth will be considered as purely under diffusional control, and the thermal balance only used to derive simplified boundary conditions for the mass flow. The heat flows and mass flows can be approximated according to the above assumption using the equilibrium flow densities which are then valid during the entire growth process. The mass balance through a spherical surface is in general $$\frac{d}{dr}(r^2 N_{v_r}) = 0, \qquad (2\text{-}19)$$

where the coordinate r has its origin on the particle surface and is directed radially outward. The molar vapor stream density $N_{v_r}$ at the particle surface can be described according to Bird et al. /20/ by Fick's 1st diffusion law $$N_{v_r} = x_v N_{v_r} - cD_{vg}\frac{dx_v}{dr} \qquad (2\text{-}20)$$

in which the driving concentration gradient is formulated by the mole fraction for water vapor $x_v$ and c is the total molar concentration of all components in the system under consideration. For a simplified description of the problem, we restrict ourselves to a binary system of vapor and gas having only one condensable component. The convective term in equation (2-20) describes the Stefan stream, which is explained in section 2.2.4.

Solving the usual differential equation (2-19) taking into account (2-20) gives, for the boundary conditions $$r = R_p \rightarrow x_v = x_{vs}$$

$$r \rightarrow \infty \rightarrow x_v = x_{vs,\infty}$$

the concentration profile in the surroundings of the droplet surface:

$$\frac{1-x_v}{1-X_{vs_p}} = \left(\frac{1-x_{vs}}{1-x_{vs\infty}}\right)^{R_p/r}. \qquad (2\text{-}21)$$

Using this concentration profile in equation (2-20) gives the vapor stream density $N_{vR_p}$ at the particle surface as $$N_{v_{s_p}} = -\frac{cD_{vg}}{R_p}\ln\left(\frac{1-x_{vs}}{1-x_{vs\infty}}\right). \qquad (2\text{-}22)$$

The change in particle mass with time due to accumulation of molecules on the surface is $$\rho_l \frac{d}{dt}\left(\frac{4}{3}\pi R_p^3\right) = -4\pi R_p^2 M_w N_{v_{s_p}}. \qquad (2\text{-}23)$$

Substituting (2-22) in (2-23) gives the growth equation for a droplet. It has been assumed that the vapor and liquid phases are in equilibrium at the surface of the particles. Thus the molar fraction $x_{vs}$ of the water vapor at this point is a function of the initially still unknown surface temperature $T_s$. The temperature profile in the surroundings of the droplet can be determined using the steady-state thermal diffusivity equation in a radial direction for the case of the sphere, $$u_r\frac{dT}{dr} = a\frac{1}{r^2}\frac{d}{dr}\left(r^3 \cdot \frac{dT}{dr}\right), \qquad (2\text{-}24)$$

when this has been solved for the boundary conditions $$r = R_p \rightarrow T = T_s$$

$$r \rightarrow \infty \rightarrow T = T_\infty$$

The velocity $u_r$ is by definition the velocity of the center of mass[2] in a radial direction and $a = \lambda/\rho c_p$ is the thermal diffusivity of the gas/vapor mixture which, completely analogously to Fick's diffusion law, can be expressed as thermal diffusion coefficient. However, this term will be avoided below, in order to avoid confusion with the thermal diffusion coefficient $D_i^T$ as defined for the first time in Chapman /21/ to formulate the thermal diffusion. Solving this differential equation (2-24) according to Pesthy et al. /22/ gives $$\frac{T-T_\infty}{T_s-T_v} = \frac{\left(\frac{1-x_{vs}}{1-x_{vs\infty}}\right)^{Le^{-1}(M_W/M_l)(R_p/r)} - 1}{\left(\frac{1-x_{vs}}{1-x_{v\lambda_s}}\right)^{Le^{-1}(M_p/M_l)} - 1}, \qquad (2\text{-}25)$$

where $Le = a/D_{vg}$ is the Lewis number, which can be interpreted as a ratio of heat transport due to thermal diffusivity and mass transport due to diffusion. For $$21\, u_r \cong -\frac{M_W}{M_L}\frac{D_{vg}}{R_p}\left(\frac{R_p}{r}\right)^2 \ln\left[\frac{1-x_{vs}}{1-x_{vs\infty}}\right], \text{ see also equation (2-60) for a definition}$$

$$Le^{-1}(M_W/M_L)\ln\left(\frac{1-x_{vs}}{1-x_{vs\infty}}\right) \ll 1 \qquad (2\text{-}26)$$

the temperature profile simplifies to $$\frac{T-T_\infty}{T_s-T_\infty} = \frac{R_p}{r}. \qquad (2\text{-}27)$$

This is known as the solution of the steady state thermal diffusivity equation (2-24) when the convective term is ignored. Using the condition (2-26) an estimate can thus be made as to whether convective effects must be taken into account on heat transfer. Ignoring the convective term requires a high dilution of the vapor component in the carrier medium under consideration. Assuming in the industrial implementation of moderate supersaturations of only a few percent and temperatures below 100° C., this condition is generally safely fulfilled. If the thermal diffusivity of the vapor-air-mixture is estimated by the value for pure air, this always gives, under the abovementioned conditions for equation (2-26) a value less than $10^{-4}$, so that convective effects, to a first approximation, need not be taken into account. Because of the analogy between heat exchange and mass transfer, this result can be applied to the concentration profile of the water vapor and gives $$\frac{x_v - x_{vs\infty}}{x_{vs} - x_{vs\infty}} = \frac{R_p}{r}. \tag{2-28}$$

Forming from (2-28) the derivation $dx_v/dr$ and substituting this term in equation (2-20), ignoring the preconditions of the convective term (Stefan stream), gives the vapor stream density of the particle surface $$N_{v_{Rp}} = R_p^{-1} c D_{vg}(x_{vs} - x_{vs\infty}). \tag{2-29}$$

With the mass balance (2-23) for the growing particles, the known growth equation (Maxwell (1877), /19/) for individual droplets in a supersaturated atmosphere in the case of purely diffusion-controlled droplet growth results as $$\frac{dR_p}{dt} = \frac{M_W D_{vg}(p_{vs\infty} - p_{vs})}{\rho_1 RT} \cdot \frac{1}{R_p}. \tag{2-30}$$

The classical derivation, however, did not take into account the fact that condensation is a coupled thermal transport and mass transport and generally both exchange parameters can be rate-determining for the process. Condensation of the vapor liberates latent heat which is given off to the droplets and the surrounding medium. Observing condensation processes makes evident the fact that the great majority of the latent heat is given off to the surrounding medium, since otherwise there would be a constant increase in droplet temperature and condensation would inevitably cease. A slight increase in temperature at the droplet surface must occur in any case, in order to effect a driving temperature gradient in the Fourier thermal diffusion. A rough estimate of the heat flow direction can be made for the continuum region by comparing the thermal diffusivity of air $a_L$ and water $a_W$. The higher the thermal diffusivity, the more rapidly will a temperature change propagate in the medium. At a temperature of 323.15 K, this gives for water $a_W$=1.550 $10^{-4}$ m²/s and for air $a_L$=2.594·$10^{-2}$ m²/s, the values for air being higher by approximately 2 orders of magnitude. This indicates a preferred removal of the latent heat into the surrounding medium. Ignoring the water vapor in the air should be justified in this estimate, since high dilution of the vaporous component has been assumed in the above derivation.

The growth equation taking into account coupled heat transport and mass transport was first derived by Fuchs (1959) /23/. He took into account the latent heat of condensation, the Stefan stream and the temperature dependency of the diffusion coefficient. He further showed that a closed solution for the coupled heat transport and mass transport can only be found if there are small temperature differences between the droplet and the surrounding medium, so that linearization of the equation systems is possible (see equation (2-32) below). The Kelvin effect (2-12) and the effect of soluble substances (2-14) on the vapor pressure of the surface of the particles was also taken into account later in the derivation according to Mason (1971) /24/. Wagner (1982) /25/ finally used the 1st order solutions of the Boltzmann equation, which were obtained by the Enskog interference theory, to formulate the complete problem. Barrett & Clement (1986) /2/ provided an analytical solution taking into account the radiant heat, and, in addition to the superimposition effects, also ignored the temperature effect on the transport coefficient. It is shown in section 2.2.4 that, in most industrial applications, this is a useful restriction, which does not substantially effect the accuracy of the result. The mass stream density at a spherical surface has been derived, on the basis of the strict kinetic gas theory of Hirschfelder /26/ and then by Clement /27/ as $$j_v = \frac{M_W p}{RT} D_{vg} \nabla \ln\left(1 - \frac{p_v}{p}\right) \text{ or} \tag{2-31a}$$

$$j_v = -D_{vg}\left(\nabla \rho_v - \frac{\rho_v}{\rho_W} \nabla \rho_g\right). \tag{2-31b}$$

The 2nd term in equation (2-31b) characterizes the Stefan stream. In the steady-state case, $\Delta j_v$=0 and, in the case of spherical symmetry, integration of (2-31a) within the limits $r=R_p$ and $r\to\infty$ and $P_v=p_{vs}(T_s)$ and $p_v=p_{vs,\infty}$, after separating the variables, gives the total mass stream which leaves the droplets as $$I_{v_{Rp}} = 4\pi R_F \frac{M_W p}{RT} D_{vg} \ln\left(\frac{p - p_{vs\infty}}{p - p_{vs}(T_s)}\right). \tag{2-32}$$

$I_{vRp}$ takes negative values if $p_{vs,\infty} > p_{vs}(T_s)$, that is to say the vapor flows to the particle surface. In the derivation it has been assumed that the radial dependence of $D_{vg}/T$ can be ignored. Since $D_{vg} \sim T^{3/2}$ (Hirschfelder /26/) and usually there are small temperature differences ($T_s-T_\infty$), this is an acceptable simplification.

The heat flow from the entire droplet surface into the surrounding medium is given from a balance of the heat transported externally by conduction and the heat transported to the droplet surface by convection. It is assumed here that before condensation the nucleus has the temperature of the surrounding medium. In the coordinate system defined, this thus gives $$Q_{v_{Rp}} = -4\pi r^2 \lambda_L \frac{dT}{dr} + h_v(T) I_{v_{Rp}}. \tag{2-33}$$

Assuming $h_v(T(r))=h_v(T_s)$, equation (2-33) can be integrated simply within the above-specified limits, giving $$Q_{v_{Rp}} = 4\pi \lambda_L R_p(T_s - T_\infty) + h_v(T_s) I_{vRp}. \tag{2-34}$$

The error due to the simplification with respect to radial enthalpy dependence is, owing to the slight differences between the temperature of the droplet surface $T_s$ and the surrounding medium at infinite distance from the droplet surface $T_\infty$ can safely be ignored for most aerosol systems. Obviously, the departing heat flow can also be formulated using the specific enthalpy of the droplet $h_l(T_s)$ ($Q_{vRp}=h_l(T_s) I_{VRP}$, giving, together with equation (2-34)

$$I_{v_{Rp}} = -\frac{4\pi \lambda_L R_p (T_s - T_\infty)}{L(T_s)}, \quad (2\text{-}35)$$

where $L(T_s)=h_v(T_s)-h_l(T_s)$, the latent heat of condensation.

The mathematical procedure to determine the growth equation (2-36), following the discussion of Barrett & Clement, may be briefly described at this point: using equation (2-32) and the mass balance (2-23) for the growing droplets, in which case the relationship $I_{v_{Rp}}=4\pi R_p^2 M_w N_{v_{Rp}}$ between mass flow rate and molar stream density of the vapor phase is used, gives an expression for the growth equation as a function of the partial pressure gradient of the vapor phase. Initially, here, the droplet temperature $T_s$ is still unknown. The natural logarithm occurring in equation (2-32) is linearized for simplification by a Taylor expansion.

A further simplification of the problem is possible for small temperature differences, if the unknown vapor pressure $p_{vs}(T_s)$ is also linearized by a Taylor expansion around $T_\infty$ with interruption after the 2nd term, and is then calculated using the vapor pressure equation of Clausius/Clapeyron. A relationship between the unknown droplet temperature $T_s$ and the growth rate $dR_p/dt$ is given by equation (2-35) together with the mass balance (2-23), The coupling between heat exchange and mass transport is then made by substituting the resulting relationship into the growth equation which then gives the growth rate as a function of supersaturation S $$\frac{dR_p}{dt} = \frac{S-1}{\rho_l R_p} \left[ \frac{L^2}{\lambda_L R_v T_\infty^2} + \frac{p - Sp_{vs}(T_\infty)}{pD_{vg}\rho_{vs}(T_\infty)} \right]^{-1} = \frac{A_R(T_s p_s S)}{R_p}. \quad (2\text{-}36)$$

Taking into account the Kelvin effect which retards the condensation process, since the vapor pressure elevation over convex surfaces decreases the vapor pressure gradient active during diffusion, then, taking into account the Kelvin equation (2-12), which is linearized by Taylor expansion for S=1 gives $$\frac{dR_p}{dt} = \frac{S - 1 - \dfrac{2\sigma_{gl}M_W}{\rho_l RTR_p}}{\rho_l R_p \left[ \dfrac{L^2}{\lambda_L R_v T_\infty^3} + \dfrac{p - Sp_{vs}(T_\infty)}{pD_{vg}\rho_{vs}(T_\infty)} \right]}. \quad (2\text{-}37)$$

If non-vaporizing soluble components are present in the liquid, a vapor pressure depression (see FIG. 2-1) accelerating the condensation process occurs, and incorporating the equation which has also been linearized for small supersaturations (2-14) gives, according to Mason /24/

$$\frac{dR_p}{dt} = \frac{S - 1 - \dfrac{2\sigma_{gl}M_i}{\rho_l RTR_p} + \dfrac{3im_S M_W}{M_s \rho_l 4\pi R_p^3}}{\rho_l R_p \left[ \dfrac{L^2}{\lambda_L R_v T_\infty^2} + \dfrac{p - Sp_{vs}(T_\infty)}{pD_{vg}\rho_{vs}(T_\infty)} \right]}. \quad (2\text{-}38)$$

Table 2-2 gives the different growth rates $dR_p/dt$, listed according to equations (2-30), (2-36), (2-37) and (2-38) which are given, for example, by the physical parameters and boundary parameters for the pilot-scale experimental plant operated by us ($T_\infty=320.65$ K, p=1 bar and S=1.079).

TABLE 2-2

Comparison of the growth rates for different droplet radii $R_p$

| $R_p$ [μm] | 2-30 [m/s] | 2-36 [m/s] | 2-37 [m/s] | 2-38 [m/s] | Del1 [−] | Del2 [−] |
|---|---|---|---|---|---|---|
| 0.050 | 6.733E-03 | 6.662E-04 | 5.246E-04 | *** | 0.235 | *** |
| 0.100 | 3.366E-03 | 3.431E-04 | 3.027E-04 | 1.030E-03 | 0.118 | 2.003 |
| 0.150 | 2.244E-03 | 2.287E-04 | 2.108E-04 | 3.545E-04 | 0.078 | 0.550 |
| 0.200 | 1.663E-03 | 1.716E-04 | 1.615E-04 | 2.069E-04 | 0.059 | 0.206 |
| 0.250 | 1.347E-03 | 1.372E-04 | 1.308E-04 | 1.494E-04 | 0.047 | 0.089 |
| 0.300 | 1.122E-03 | 1.144E-04 | 1.099E-04 | 1.189E-04 | 0.039 | 0.039 |
| 0.350 | 9.619E-04 | 9.804E-05 | 9.474E-05 | 9.959E-05 | 0.034 | 0.016 |
| 0.400 | 8.416E-04 | 8.578E-05 | 8.326E-05 | 8.610E-05 | 0.029 | 0.004 |
| 0.450 | 7.481E-04 | 7.625E-05 | 7.425E-05 | 7.603E-05 | 0.026 | 0.003 |
| 0.500 | 6.733E-04 | 6.862E-05 | 6.701W-05 | 6.817E-05 | 0.024 | 0.007 |

The cells labeled by *** mean that the solubility limit (here NaCl at 320.65 K; 37.0 g/100 g of twice-distilled water) was exceeded, and thus Raoult's law used in (2-38) is no longer valid.

Taking into account the solution effect, the mass of a solid NaCl nucleus having an equivalent diameter of a sphere of the same volume of 0.1 μm was given. "Del1" and "Del2" describe the relative deviation of (2-37) from (2-36) or of (2-38) from (2-36). Using these two parameters the limit can be determined above which the Kelvin effect or solution effect should be taken into account. It is shown that for the given boundary conditions solely taking into account vapor diffusion as a rate-determining factor in condensation is not sufficient. Generally, the growth rates are reproduced about an order of magnitude too high. Taking into account the coupled heat transport and mass transport, in contrast, provides a good basis for the calculation. Only for particle sizes where $R_p<0.3$ μm should the effect of surface curvature and solution effects he incorporated into the calculation, since the relative deviation is greater than 5%. The high rate of droplet growth at high concentrations of dissolved substances is noteworthy. However, since these are only present at very small droplet dimensions, the influence of the concentration on the total time to form a droplet having a diameter of, for example, 3 μm³, due to the constantly decreasing concentration, is then ultimately low. Therefore, the growth model according to equation (2-36) in section 2.2.2.2 was used for determining the droplet size distributions by condensation. In this model, the growth rate—as in the classical Maxwell solution—is inversely proportional to the particle radius and a simple solution of the conservation equation (2-43) in continuous form can be derived.

[3] Minimum size to achieve efficient separation in inertial separators

TABLE 2-3

Temperature difference ($T_s$-$T_\infty$) during condensation for different droplet radii $R_p$

| $R_p$ [μm] | 2–30 [K] | 2–36 [K] | 2–37 [K] | 2–38 [K] |
|---|---|---|---|---|
| 0.050 | 14.045 | 1.432 | 1.094 | *** |
| 0.100 | 14.045 | 1.432 | 1.263 | 4.299 |
| 0.150 | 14.045 | 1.432 | 1.319 | 2.219 |
| 0.200 | 14.045 | 1.432 | 1.347 | 1.727 |
| 0.250 | 14.045 | 1.432 | 1.364 | 1.558 |
| 0.300 | 14.045 | 1.432 | 1.375 | 1.488 |
| 0.350 | 14.045 | 1.432 | 1.383 | 1.454 |
| 0.400 | 14.045 | 1.432 | 1.389 | 1.437 |
| 0.450 | 14.045 | 1.432 | 1.394 | 1.427 |
| 0.500 | 14.045 | 1.432 | 1.398 | 1.422 |

The cells labeled by *** mean that the solubility limit (here NaCl at 320.65 K: 37.0 g/100 g of twice-distilled water) was exceeded, and thus Raoult's law used in (2–38) is no longer valid.

From the above data for growth rate, together with equation (2-35) the temperature differences between surface and surrounding medium, $T_s$-$T_\infty$ can be determined to a good approximation. The resultant values are listed in Table 2-3. In the classical solution (2-30) and the expanded solution (2-36), no relationship between surface temperature and particle radius can be observed. As a result of the growth rates which are determined to be too high according to (2-30), the temperature differences, at approximately 14 K, are also an order of magnitude too high. In general it is found that for the present application, as moreover in most industrial aerosol systems, the temperature increase is ≈1 K and is thus negligible. It may again be mentioned that this may only be allowed for small supersaturations. In many practical applications, supersaturations of up to 3 may certainly occur. In this event, reference is made to the more recent study by Williams /28/, which studies the accuracy of (2-36) and has developed a modified growth equation which gives more precise results at high supersaturations.

The conditioning of aerosol particles by accumulation of water vapor is an effective mechanism with respect to simple separation of submicron pollutant particles in standard inertial separators. If droplet sizes above approximately 3 $\mu$m are achieved, these droplets can be removed from the gas stream highly effectively using an aerocyclone, for example. In the course of these studies, fundamental experiments have been carried out on a pilot-scale plant which are intended to demonstrate the possibilities for particle conditioning and separation. It was clearly found that even on a pilot-plant scale, heterogeneous water vapor condensation can be carried out so efficiently that a droplet growth acceptable for inertial separation results. Using the results achieved allows an equipment design in principle to be made for a gas cleanup plant on a larger scale, whose essential aspects are summarized as follows:

Since owing to the Kelvin effect, the water vapor preferentially condenses on planar surfaces, the condensation must preferably take place in the free gas space, so that as large a proportion as possible of the amount of water vapor which can condense out serves to increase the submicron pollutant particles to be removed. In this context, adding water-vapor-saturated cold air to the warm exhaust gas stream, which is frequently saturated with water vapor as a result of the process, to generate the supersaturation has been favored. The best results with respect to droplet growth have been achieved with supersaturations in the range of approximately 50%. Only at these supersaturations did such sufficiently large droplets form (>3 $\mu$m), which can be removed without problems in the high-efficiency cyclone used At the proposed supersaturations, broad nucleus size distributions, once activated, grow rapidly to form narrow quasi-monodisperse droplet size distributions. This offers the advantage that, because of the then virtually constant probability of separation in the inertial separator used, all nucleus sizes can be removed with equal efficiency.

In addition to the total concentration, the surface properties of the particles play a critical role to achieve good separation results. With decreasing wettability, the supersaturations required for condensation increase. The experimental results with quartz particles show that, compared with salt particles, the width of the resultant droplet size distribution increases and the nucleus activation significantly decreases. An increase in supersaturation introduced no improvements here, which supports the hypothesis that the maximum possible supersaturations in the experimental system are not achieved if nucleus particles are present. This is particularly clear when salt nuclei are present, which already act as condensation surfaces at very low supersaturations, and thus prevent the buildup of relatively high supersaturations. The moderate separation result in the quartz experiments may therefore be explained by the experimentally unavoidable contamination with salt nuclei, up to 25%, which are present as residues from warm air saturation. For this application, obviously the limits of the mixing technique used have been achieved. Although better results are certainly possible, they require, for example, a more intensive mixing of the two air streams to generate higher supersaturations.

Nucleus activation at larger tube cross sections must also be seen in this context, in the case of which the uniform mixing of the two air streams becomes more difficult or more energy-intensive. A homogeneous mixture from the molecular aspect cannot be achieved using the mixing technique selected here. As a result nucleus activation is always incomplete, which ultimately leads to concentration-dependent degrees of separation for the submicron nuclei. Furthermore, selective activation above the critical nucleus diameter was only observed as a trend, which also indicates incomplete mixing. An increase in residence time does not result in any significant promotion of nucleus activation, although slight improvement in the region of the larger nuclei was observed. To improve nucleus activation, improved dispersion of the cold air is necessary in order to support the mixing process. At large tube cross sections, for example a number of injection points can be provided over the tube cross section.

Overall, both the coarse-scale mixing of the two air streams, and also the heterogeneous water vapor condensation proceed very rapidly (within less than 100 ms), so that the distance between the condensation space and separator can be minimized or the separator itself can be modified so that the condensation takes place "on site". This is a further significant advantage of this separation technique, since existing plants may, if required, be retrofitted in a simple and inexpensive manner, not least since many of the plant components required are frequently already present in the case of exhaust gas cleanup plants. A further advantage of the separation technique presented is the steady-state mode of operation without cleaning cycles, which lead to peaks of pollutant emission.

If the particulate impurities in the exhaust gas are salt particles, their removal in packed columns is of interest in terms of process-engineering and energy. In packed columns, although only relatively small supersaturations below 10% can be achieved industrially, these are completely sufficient to activate salt nuclei (see FIG. 2-1). If droplet sizes of approximately 5 $\mu$m are achieved in this manner, effective separation in such apparatuses is also possible. Separation experiments on packed columns on a pilot-plant scale have been carried out by the author /89/ for ammonium chloride particles having a concentration of 20 mg/m$^3$. Depending on the choice of thermodynamic and fluiddynamic operating parameters, degrees of mass separation of far above 90% were measured. Combined with absorption of pollutant gas components (HF, HCl, . . .), an efficient exhaust gas cleanup system can thus be provided, which combines aerosol and gas separation in a packed column. This concept is of particular interest for exhaust gas streams below 10 000 m³/h (at STP), but is not limited to this range.

LIST OF REFERENCES

/1/ Strafler, P.: Betriebserfahrunden mit der Rauchgasentschwefelungranlage Futterer, V. des Rheinhafen-Dampfkraftwerkes und des GroBkraftwerkes Mannheim Staub Reinh. L. 46 (1986) 10, S. 63 (Beil.)
/2/ Barrett, J. C: Growth Rate For Liquid Drops Clement, C. F: J. Aerosol Sel. 19 (1988) 2, S. 223–242
/3/ Yoshida, T: Growth of Aerosol Particles by Condensation Kousaka, Y. Ind. Eng. Chem. Fundam. 15 (1976) 1 Okuyama, K
/4/ Yoshida, T. Application of Particle Enlargement by Condensation to Kousaka, Y. Industrial Dust Collection Okuyama, KK J. Chem. Eng. Japan 11 (1978) 6 Nomura, F
/5/ Semrau. K Wet Scrubber Liquid Utilization Witham, G L Stanford Research Inst Menlo Park. California EPA Contract No 68-02-1079, Oct 1974
/6/ Lehmann, M EinBvB Kondensationseffekten auf die Staubabscheidung Widmer, F Chimia 31 (1977) 8, S 325
/7/ Lancaster, B W A Study of Stream Injection into Wet Scrubbers Strauss, W Ind. Eng. Chem. Fundam. 10 (1971) 3
/8/ Buttner, H Untersuchungen uber den EinfluB von Kondensationsvorgangen in naBarbeitenden Abscheidern Dissertation, Universitat Kaiserslautern, 1978
/9/ Fattinger, V Probleme der naβ-mechanischen Abscheidung feinster Partikeln Schneider, J aus Gasstromen Chem. Rundschan 28 (1975) 18
/10/ Fattinger, V Abwasserfreies Rauchgas-Waschverfahren Chemie-Technuk 9 (1980) 6, S 277
/11/ Jager, H-P. Erfahrungen mit der Verbrennung von organika- und salzhaltigen Prozeβwasser Technische Mitteilungen 80 (1987) 6, S. 384
/12/ Amelin, A. G.: Theory of Fog Condensation Israel Program for Scientific Translations, 2nd Edition, 1967
/13/ Kelvin: Proc. Roy. Soc. (London). 7:63, 1870
/14/ Fletcher, N. H.: Size Effect in Heterogeneous Condensation J. Chem. Phys. 29 (1958) 3, S 572–576
/15/ Chen, C.-C.: Heterogeneous Nucleation of Water Vapor on Particles of SiO₂ Hung, L.-C. Al₂O₂, TiO₂ and Carbon Black Hsu H.-K. J. Colloid Inter. Sci. 157 (1993, S. 465–477
/16/ Ayala, R. E.. Powder Technol. 51 (1987) S. 3 Casassa, E Z. Parfitt, G D.
/17/ Bergh, A A. J. Electrochem. Soc. 112 (1965), S 457
/18/ Pashley, R. M: J. Colloid Inter. Sci. 71 (1979), S. 491
/19/ Maxwell, J C In Encylopeida Britannica, 2 (1877) s 82ff.
/20/ Bird, R B Transport Phenomena Stewart, W E Wiley, New York, 1960 Lightfoot, E N
/21/ Chapman, S Phil. Mag. 33 (1917) S 248 Dootson, F W
/22/ Pesthy, A J The Effect of a Growing Aerosol on the Rate of Homogeneous Flagan, R C Nucleation of a Vapor Seinfeld, J H J. Colloid Int. Ser 82 (1981) S 465-14 479
/23/ Fuchs, N A Evaporation and Droplet Growth in Gaseous Media Pergamon Press, London, 1959
/24/ Mason, B The Physies of Clouds Clarendon Press, Oxford (2nd ed). 1971
/25/ Wagner, P E Aerosol Growth by Condensation In Aerosol Microphysics II (Heraugeber W H Marlow). Springer, Berlin, 1982
/26/ Hirschfelder, J O.: Molecular Theory of Gases and Liquids Curtiss, C. F. Wiley, New York, 1954 Bird, R. B.
/27/ Clement, C F: Aerosol Formation from Heat and Mass Transfer in Vapour-Gas Mixtures Proc. R. Soc. Lond. A398 (1985) S 307–339
/28/ Williams, M. M. R. Growth Rates of Liquid Drops for Large Saturation Ratios J. Aerosol Sci. 26 (1995) 3, S. 477–487
/55/ Sachweh, B: Erweiterung des Meβbereiches eines optischen Partikelzahlers durch moderne digitale Signalverarbeitungstechniken. Dissertation, Universitat Kaiserslautern, 1991
/56/ Umhauer, H.: Particle Size Distribution Analysis by Scattered Light Measurements Using an Optically Defined Measuring Volume. J. Aerosol Sci. 14 (1983) S. 765–770
/89/ Sachweh, B.: New Technologies for the Conditioning of Waste Gas to Bottner, H. Improve Submicron Particle Separation by Heterogeneous Ebert, F. Condensation of Water Vapor Abstracts of the Annual Meeting of the American Association for Aerosol Research, 1996, Orlando, USA In this case, in particular equations 2, 3 and 4

$$\ln S = \frac{2\sigma_{gl}v'_l}{kTR_p^*} = \frac{2\sigma_{gl}M_w}{\rho_1 RTR_p^*} \qquad \text{Eq-2}$$

$$\ln S = \frac{2\sigma_{gl}M_w}{\rho_1 RTR_p^*} + \ln(\gamma_w) - \ln\left(1 + \frac{3im_s M_w}{M_s \rho_l 4\pi R_p^{*3}}\right) \qquad \text{Eq-3}$$

$$\ln S = \left[\frac{8\pi\sigma_{12}^3 f(m,x)v'^2_1}{3k^3 T^3 \ln[(1/(4\pi R_p^2 K)]}\right]^{1/2} \qquad \text{Eq-4}$$

which are described in the abovementioned postdoctoral thesis as equations 2-12, 2-14b or 2-18 on pages 8, 9 and 12, are relevant, for example, to particles which can be wetted, dissolved or are difficult to wet by the scrubbing liquid.

From a Köhler curve which has been calculated in this way, it is possible, for the particles calculated, to obtain information as to what degree of saturation allows nucleation with what particular particle size. The degree of saturation should be set in such a way that particles with a size of up to approximately 50 nm can contribute to nucleation. Smaller particles should not be taken into account for nucleation.

Express reference is hereby made to the equations and calculation methods listed in this postdoctoral thesis, and the disclosure of the postdoctoral thesis is regarded as part of the disclosure of the present text.

A further possibility of estimating whether the level of supersaturation which can be achieved with the operating parameters set is sufficient to separate out the particulate contaminants can be obtained from a calculation of the adiabatically condensable vapor $D_{ad}$. If the supersaturated gas phase is used to calculate an adiabatic equilibrium stage, according to equation 5 the adiabatically condensable vapor $D_{ad}$ is $$D_{ad} = \frac{M_{K,ad}}{V^N_{G,tr}} \qquad \text{Eq-5}$$

where $M_{K,ad}$ represents the condensate flow in g/h and $V^N_{G,tr}$ represents the fraction of the gas phase which cannot be condensed without deep cooling, at standard temperature and pressure in m³/h.

In the borderline case where the heat of condensation is not emitted to a coolant, at most this amount of vapor can condensate out onto condensation nuclei. If the number of condensation nuclei per unit volume of gas stream and the calculated amount of adiabatically condensable vapor are known, it is then possible to calculate a mean droplet size of the mist formed under ideal conditions. It is thus possible to provide a rough estimate of the maximum droplet growth which is possible. In doing this, it is necessary to take into account the fact that the droplet diameter which is actually achieved will generally lie below the calculated value. Therefore, in practice an estimation of the maximum possible droplet size carried out in the manner described above should give a value of at least approximately 4 μm, but preferably a greater value.

If the particulate contaminants to be found in the gas stream, as well as their wetting behaviors, are known, and Köhler curves are calculated with the aid of the calculated degrees of saturation $S_i$, it is possible to estimate whether the degree of saturation achieved in each segment is sufficient to separate out particulate contaminants of a certain size. In a preferred embodiment of the invention, the Köhler curve is used to set the degree of saturation in such a way that the smallest particles which can be separated out have a nucleus radius of approximately 50 nm.

In a further preferred embodiment, the information about the segment-dependent degrees of saturation $S_i$ is utilized, with the aid of one or more further equations, to calculate the droplet growth as a function of time during passage through the scrubber column.

$$\frac{dR_p}{dt} = \frac{S-1}{\rho_l R_p} \left[ \frac{L^2}{\lambda_L R_v T_\infty^2} + \frac{p - Sp_{vs}(T_\infty)}{pD_{vg}\rho_{vs}(T_\infty)} \right]^{-1} = \frac{A_R(T, p, S)}{R_p} \quad \text{Eq-6}$$

$$\frac{dR_p}{dt} = \frac{S - 1 - \frac{2\sigma_{gl}M_w}{\rho_l RTR_p}}{\rho_l R_p \left[ \frac{L^2}{\lambda_L R_v T_\infty^2} + \frac{p - Sp_{vs}(T_\infty)}{pD_{vg}\rho_{vs}(T_\infty)} \right]} \quad \text{Eq-7}$$

$$\frac{dR_p}{dt} = \frac{S - 1 - \frac{2\sigma_{gl}M_i}{\rho_l RTR_p} + \frac{3im_s M_w}{M_s \rho_l 4\pi R_p^3}}{\rho_l R_p \left[ \frac{L^2}{\lambda_L R_v T_\infty^2} + \frac{p - Sp_{vs}(T_\infty)}{pD_{vg}\rho_{vs}(T_\infty)} \right]} \quad \text{Eq-8}$$

are used, which equations are described as equations 2-36, 2-37 and 2-38 on pages 20 and 21 of the abovementioned postdoctoral thesis by Dr. Ing. Bernd A. Sachweh. The information obtained in this way can then be used to obtain an optimum operation of the scrubber column.

In a further preferred embodiment, the amount of scrubbing liquid which runs through the scrubber column per unit time (E) is set in such a way that it amounts to at least 25% of the maximum possible feed level for the column specified (flood limit). The filling behavior of the column is expressed here using the feed parameter Z (feed rate).

The feed rate Z (feed parameter) is understood to mean the quotient which results from dividing the amount of liquid E entering the scrubber column per unit time by the maximum possible amount of liquid A which can leave per unit time. Therefore, for a value of Z=E/A=1, the scrubber column is at the flood limit, i.e. the column releases precisely the same amount of scrubbing liquid as flows into it. If the value of Z is greater than 1, more water flows in than is able to flow out, i.e. the scrubber column fills up with scrubbing liquid. If the value of Z is less than 1, a normal operating state generally prevails, i.e. less water flows in than is able to flow out per unit time. In a preferred embodiment of the present invention, the feed of scrubbing liquid is set in such a way that Z is at least 0.25. In a further preferred embodiment of the invention, however, the feed of scrubbing liquid is set in such a way that Z is at least 0.5, preferably at least approximately 0.7. Such high values of Z result in particularly high levels of separation for particulate contaminants combined with particularly high levels of separation for gaseous contaminants.

The present invention is explained in more detail with reference to the drawing, in which:

FIG. 1 shows an illustration of the level of separation as a function of the particle size at Z=0.25 and Z=0.75, FIG. 2 shows a diagrammatic illustration of the segmental calculation of the linked mass and heat transfer in a scrubber column, the calculation of the isothermal equilibrium stage and the level of supersaturation $S_i$, both of the adiabatic equilibrium stage and of the amount of adiabatically condensable vapor $D_{ad}$.

FIG. 3 shows thw effect of wetting angle on the critical degrees of saturation.

In FIG. 1, A represents the level of separation and dZ represents the particle size in µm. The level of separation A for a specific particle size is calculated as the quotient of the number of particles separated out and the number of particles originally present. Therefore, it can clearly be seen from FIG. 1 that for Z=0.25, a relatively constant level of separation of approximately 0.6 is established for virtually all particle sizes. If the feed of scrubbing liquid per unit time is increased, so that Z is, for example, 0.75, it can be seen from FIG. 1 that a maximum separation level can be achieved in the range from more than approximately 0.1 to approximately 0.4 µm. This is in practice desirable, since particulate contaminants of a size of less than 0.1 µm are generally not regarded as relevant for emission purposes. However, in certain cases it may be desirable to remove such particles. The method according to the invention, by controlling the parameter Z, reveals a way of taking both circumstances into account simply by changing one parameter.

FIG. 2 shows the segmental calculation of the linked mass and heat transfer in a scrubber column (3). A vapor-saturated gas stream enters at the bottom end of the column (2), and cold scrubber liquid is fed to the top end of the column in countercurrent (1). The scrubber column is theoretically divided into segments. Thus, for example, segment No. 1 (4) is situated at the top end of the scrubber column, followed by n−1 segments i (5) and a segment n (6) at the bottom end of the scrubber column.

Firstly, the sum of the partial pressures $\Sigma p_j^\infty$ and the gas temperature $T_{gas,i}^\infty$ (7) are calculated. Then, from each segment i, a pseudo gas stream i is withdrawn. For this, it is possible to calculate an isothermal equilibrium stage with the temperature $T_{gas,i}^\infty$ (9), from which, after the extraction of heat (8) has been taken into account, it is possible to obtain, firstly, the partial pressures in the gas phase in the equilibrium state $\Sigma p_i^\infty{}_{,Glw}$ (10). Furthermore, an adiabatic equilibrium stage with the temperature $T_{adiabat,i}^\infty$ (13) can be obtained from the gaseous pseudo stream i (7). From this equilibrium stage, it is possible to obtain firstly the sum of the partial pressures in the gas phase $\Sigma p_i^\infty{}_{,adiabat}$ (12) and also the amount of adiabatically condensable vapor $D_{ad}$ (14).

If, in the context of the method according to the invention, the number and size of particulate contaminants play a role, suitable measurement methods are available to the person skilled in the art in order to determine this number. An example of a suitable system is a commercially available measurement system (Scanning Mobility Particle Sizer, TSI Model 3934), which combines a condensation particle counter with a differential electric mobility analyzer. Such a measurement system makes it possible, with a high resolution, to detect, for example, particles which range in size from approximately 16 to approximately 1000 nm. To measure size distributions which are broader than the range specified above, it is possible, for example, to use a modified optical particle counter (OPZ, Umhauer design, as described in "Particle Size Distribution Analysis by Light Measurements using an optically defined measuring volume", J. Aerosol Sci. 14 (1983) pp. 765 to 770). For further suitable measurement methods, reference is made to the abovementioned postdoctoral thesis by Dr. Ing, Bernd A. Sachweh.

| List of symbols: | |
|---|---|
| A | level of separation |
| $\lambda_L$ | Thermal conductivity of the surrounding medium [W/(mK)] (air) |

-continued

List of symbols:

| | | |
|---|---|---|
| $\rho_l$ | Density of the particles (liquid) | [kg/m³] |
| $\rho_v$ | Partial density of the vapor | [kg/m³] |
| $\rho_{vs}$ | Partial density of the vapor in the state of saturation | [kg/m³] |
| $\sigma_{gl}$ | Surface tension liquid against gas | [N/m] |
| $\sigma_{12}$ | Surface tension phase 1–phase 2 | [N/m] |
| d | Particle diameter | [μm] |
| $D_{vg}$ | Diffusion constant for water vapor in air | [m²/s] |
| i | van't Hoff - factor (= 2 for NaCl when this fully dissociates) | |
| k | Boltzmann constant (1.38066 10⁻²³) | [J/K] |
| K | Coefficient of agglomeration/coagulation | [m³/s] |
| L | latent heat of condensation | [J/kg] |
| m | Mass flow rate, general | [kg/s] |
| $M_L$ | Air molar mass | [kg/kmol] |
| $M_S$ | Salt molar mass | [kg/kmol] |
| $M_W$ | Water molar mass | [kg/kmol] |
| p | Total pressure | [N/m²] |
| $p_{VS}$ | Partial pressure of water vapor in state of saturation (vapor/air mixture) | [N/m²] |
| ℜ | Universal gas constant | [J/(moL K)] |
| $R_p$ | Particle radius | [m] |
| $R_p^*$ | Particle radius in equilibrium | [m] |
| $R_v$ | Gas constant of the vapor | [J/(kgK)] |
| T | Temperature | [K] |
| $T_\infty$ | Temperature for r → ∞ | [K] |
| Z | Feed rate | |

We claim:

1. A method for removing gaseous contaminants and particulate contaminants (aerosols) from a vapor-saturated gas stream, in which method a gas stream containing
    a) at least one gaseous contaminant which is soluble in a scrubbing liquid, with or without salt formation, and
    b) at least one particulate contaminant (aerosol) with a particle size from 0.01 to 10 μm,
having a flow rate of at least 0.5 m/s and a temperature from 30° C. to 100° C. when it enters a scrubber column which has an internal surface area of from 50 to 1000 m²/m³, is brought into contact, if initially not being vapor-saturated following prior saturation with vapor, with a scrubbing liquid which has a feed parameter Z to the scrubber column and the temperature of which is lower by at least 2° C. than the temperature of the gas stream, resulting in the formation of a vapor phase, the degree of saturation S of which is greater than 1, and in the removal of the gaseous and particulate contaminants from the gas stream.

2. A method as claimed in claim 1, wherein the minimum value for S which is required in order to separate out the particulate contaminants is estimated by calculating the amount of vapor which can be condensed adiabatically, in which case the amount of vapor which can be condensed adiabatically in one volume element of the scrubber column must be sufficiently great to form, on average, a condensate droplet with a diameter of at least 2 μm per particle in one volume element given complete condensation of the total amount of vapor which can be condensed adiabatically in the same volume element.

3. A method as claimed in claim 1, wherein the Köhler curves for the particles which are present in the gas stream are calculated in order to determine the optimum degree of saturation S.

4. A method as claimed in claim 1, wherein the values for the flow rate of the gas stream, the temperature of the gas stream, the internal surface area of the scrubber column and the temperature of the scrubbing liquid are determined by simulating the droplet growth per unit time when the gas stream flows through the scrubber column in the axial direction.

5. A method as claimed in claim 1, wherein the feed parameter Z is at least 0.25.

6. A method as claimed in claim 5, wherein Z is at least 0.7.

7. A method as claimed in claim 1, wherein the scrubbing liquid used is the compound with whose vapor the gas stream is saturated.

8. A method as claimed in claim 1, wherein the scrubbing liquid used is water or an aqueous salt solution or an aqueous acid or base.

9. A method as claimed in claim 1, wherein the temperature of the gas stream is 40 to 90° C.

10. A method as claimed in claim 1, wherein the diameter of the scrubber column is 0.1 to 4 m.

11. A method as claimed in claim 1, wherein the length of the scrubber column is 0.5 to 10 m.

12. A method as claimed in claim 1, wherein the scrubber column contains packing bodies with a diameter of from 3 to 50 mm and the scrubber column has an internal surface area of from 300 to 600 m²/m³.

13. A method as claimed in claim 1, wherein the scrubbing liquid is at a temperature of from 2 to 50° C.

14. A method as claimed in claim 1, wherein the vapor-saturated gas stream and the scrubbing liquid are in countercurrent flow.

* * * * *